(12) United States Patent
Martin

(10) Patent No.: US 7,470,372 B2
(45) Date of Patent: *Dec. 30, 2008

(54) FLUID TREATMENT DEVICE

(76) Inventor: John D. Martin, 4303 Seymour Hwy., Wichita Falls, TX (US) 76309

( * ) Notice: Subject to any disclaimer, the term of this patent is extended or adjusted under 35 U.S.C. 154(b) by 0 days.

This patent is subject to a terminal disclaimer.

(21) Appl. No.: 11/653,637

(22) Filed: Jan. 16, 2007

(65) Prior Publication Data

US 2007/0108138 A1 May 17, 2007

Related U.S. Application Data

(63) Continuation of application No. 11/053,550, filed on Feb. 8, 2005, now Pat. No. 7,163,621, which is a continuation of application No. 09/978,962, filed on Oct. 15, 2001, now Pat. No. 6,852,232, which is a continuation of application No. 09/194,060, filed as application No. PCT/US97/08942 on May 23, 1997, now Pat. No. 6,322,704.

(60) Provisional application No. 60/018,168, filed on May 23, 1996, provisional application No. 60/023,679, filed on Aug. 17, 1996.

(51) Int. Cl.
*B01D 24/46* (2006.01)

(52) U.S. Cl. .......... 210/795; 210/189; 210/275; 210/289; 210/291; 210/136; 210/97; 210/90

(58) Field of Classification Search .......... None
See application file for complete search history.

(56) References Cited

U.S. PATENT DOCUMENTS

| | | |
|---|---|---|
| 1,671,864 A | 5/1928 | Higgins |
| 1,993,142 A | 3/1935 | Johnson |
| 3,415,382 A | 12/1968 | Martin |
| 3,458,436 A | 7/1969 | Martinola et al. |
| 3,568,833 A | 3/1971 | Ritzen |
| 4,019,985 A | 4/1977 | Fuller et al. |
| 4,021,339 A | 5/1977 | Foody |
| 4,643,836 A | 2/1987 | Schmid |
| 6,322,704 B1 * | 11/2001 | Martin .......... 210/661 |

(Continued)

FOREIGN PATENT DOCUMENTS

WO    WO 9744111 A1 *  11/1997

(Continued)

OTHER PUBLICATIONS

"Glass Bed Precision Filters" Product Brochure, 1976 (12 pages).

*Primary Examiner*—Robert James Popovics
(74) *Attorney, Agent, or Firm*—Roger N. Chauza P.C.

(57) ABSTRACT

A device for the treatment of an influent with a porous media. The influent passes radially through the porous media and into an internal volume of the device. The treated influent then passes through an open check valve in the internal volume, and then to downstream equipment. During a backwash operation, a backwash fluid is passed into the internal volume of the device in a direction to close the check valve. The blocked path in the internal volume of the device causes the backwash fluid to pass radially outwardly into the porous media and fluidize the same.

14 Claims, 11 Drawing Sheets

U.S. PATENT DOCUMENTS

| | | | | |
|---|---|---|---|---|
| 6,852,232 B2 * | 2/2005 | Martin | ........................ | 210/661 |
| 7,163,621 B2 * | 1/2007 | Martin | ........................ | 210/189 |
| 2002/0030017 A1 * | 3/2002 | Martin | ........................ | 210/675 |
| 2005/0133432 A1 * | 6/2005 | Martin | ........................ | 210/275 |

FOREIGN PATENT DOCUMENTS

WO     WO 2005000745 A2 *   1/2005

* cited by examiner

FIG. 1
(PRIOR ART)
FIG. 2
(PRIOR ART)
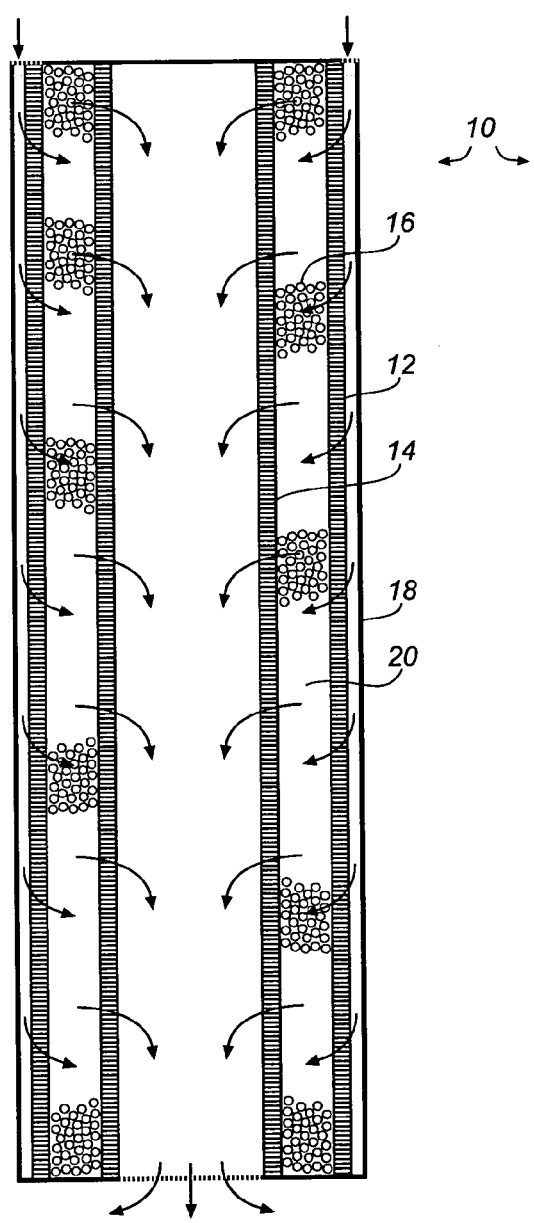
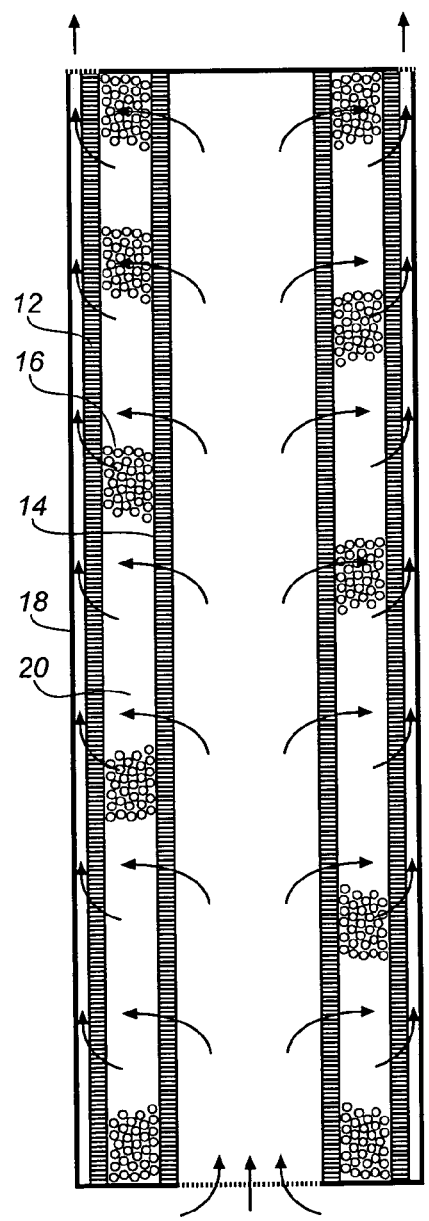

FIG. 3
FIG. 4
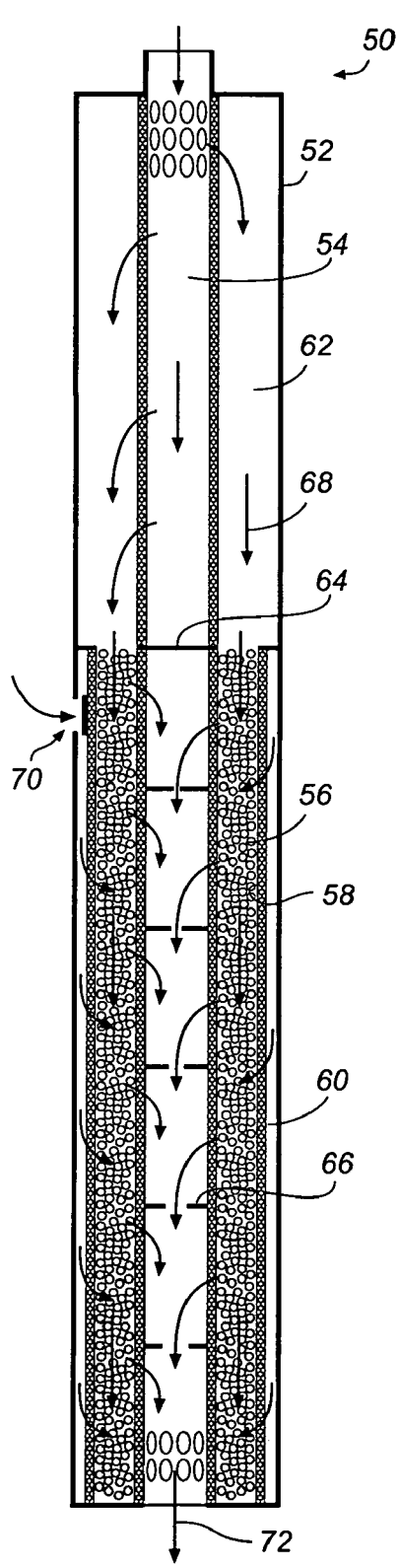
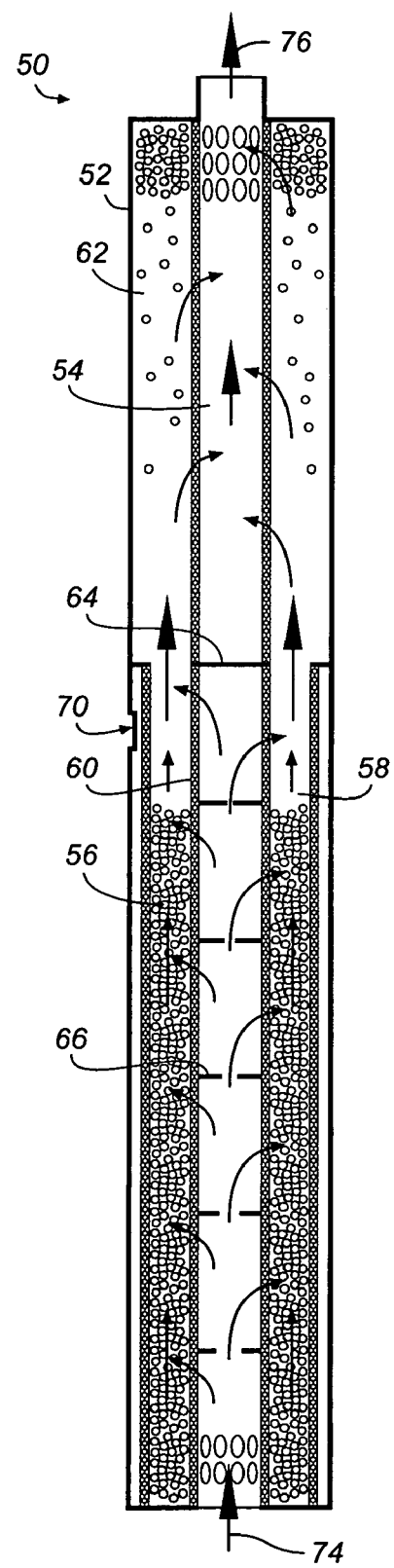

FIG. 7
FIG. 8
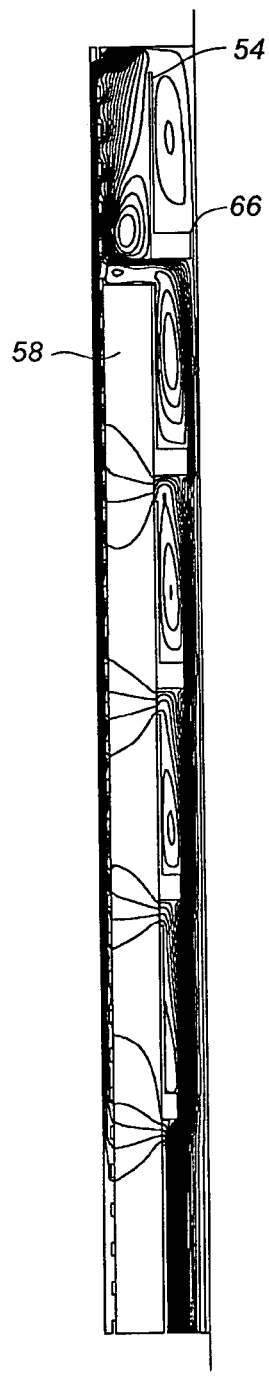
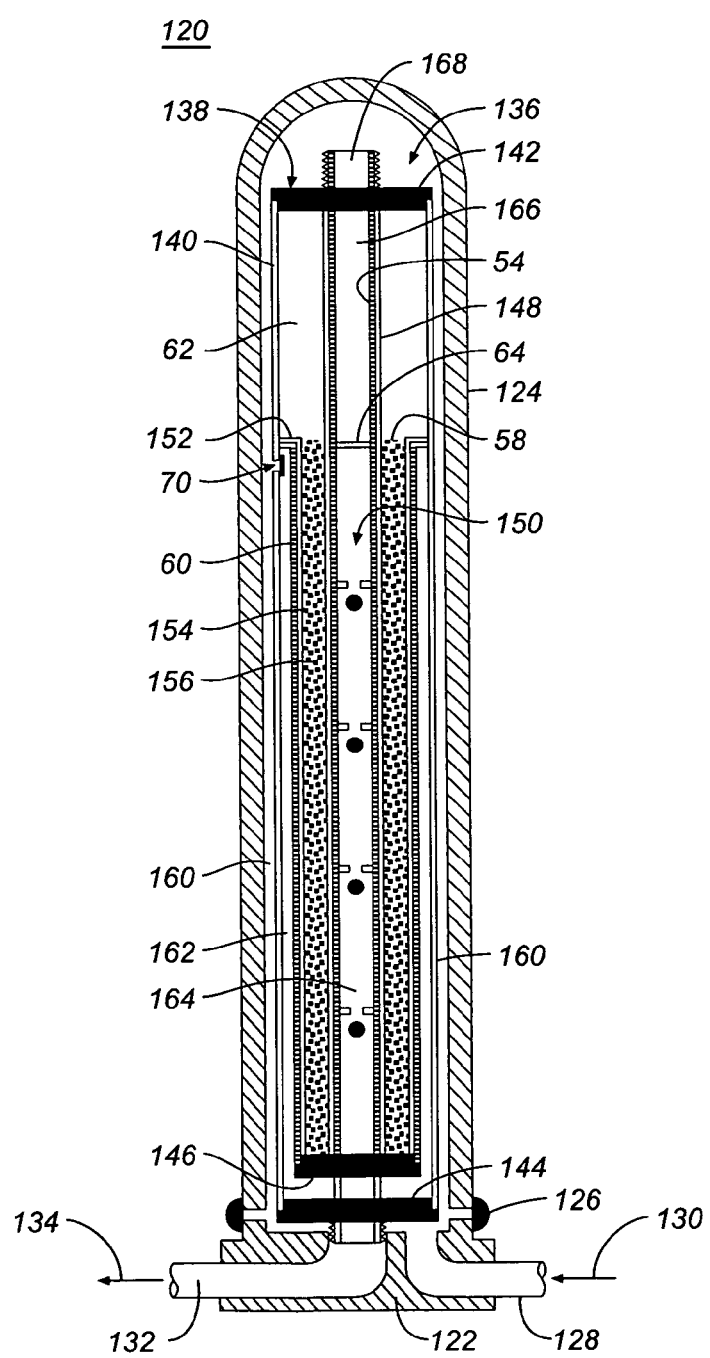

FIG. 14a
FIG. 14b
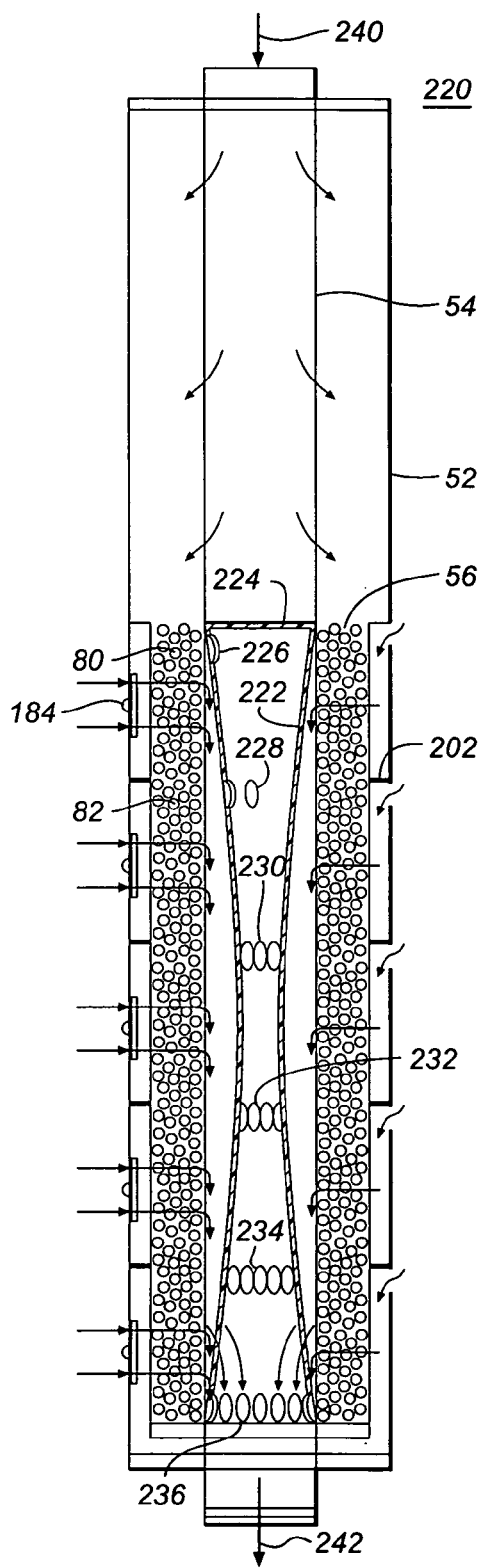
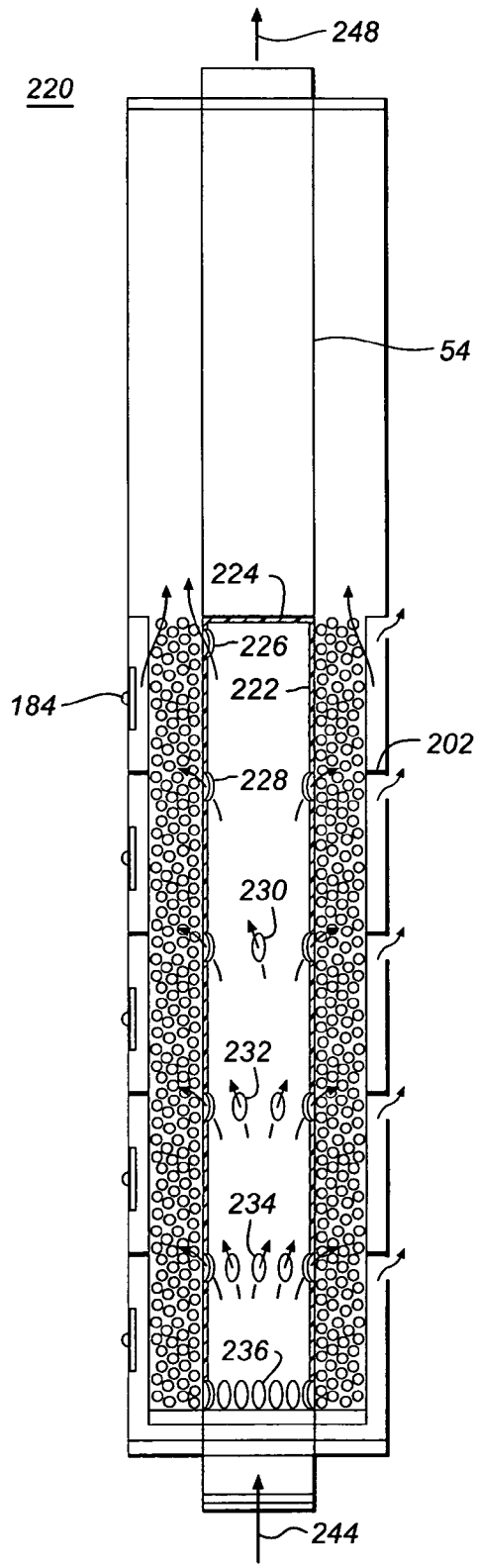

FIG. 15a
FIG. 15b
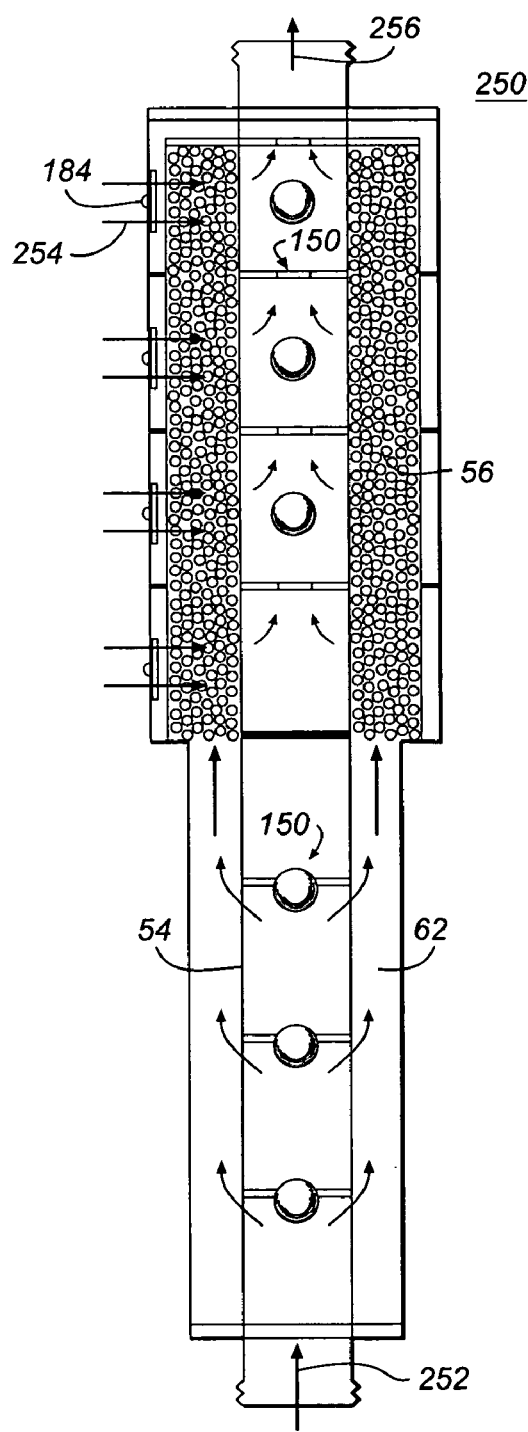
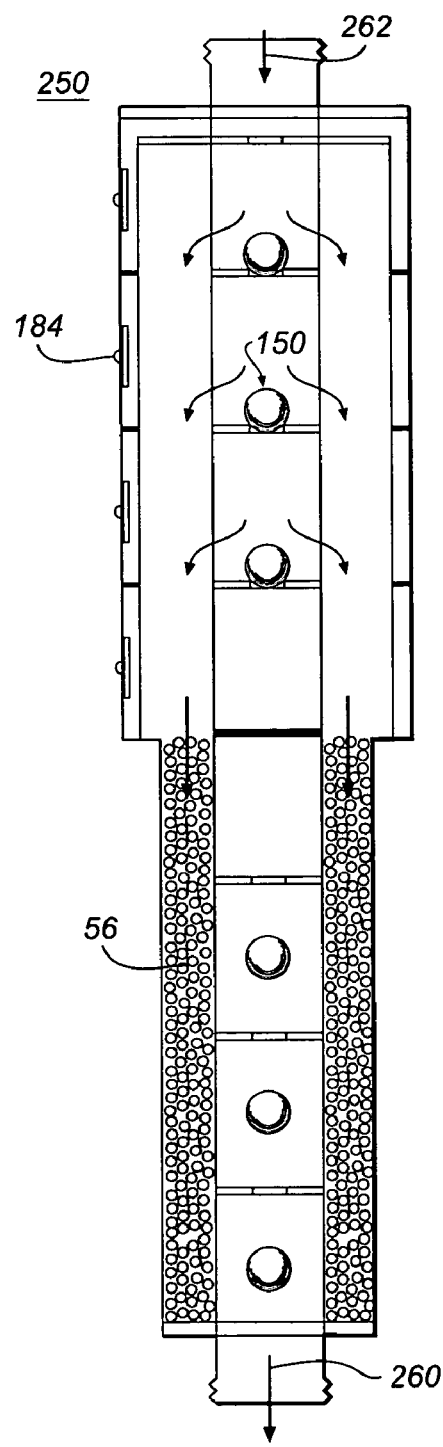

FLUID TREATMENT DEVICE

CROSS-REFERENCE TO RELATED APPLICATIONS

This application is a continuation of prior U.S. application Ser. No. 11/053,550, filed Feb. 8, 2005, now U.S. Pat. No. 7,163,621 which application is a continuation of prior U.S. application Ser. No. 09/978,962, filed Oct. 15, 2001 (now U.S. Pat. No. 6,852,232), which is a continuation of application Ser. No. 09/194,060, filed Nov. 20, 1998 (now U.S. Pat. No. 6,322,704), which is a national stage application of PCT/US97/08942 filed May 23, 1997, which is a PCT International Application which claims the benefit of U.S. Provisional Application Nos. 60/018,168 filed May 23, 1996, and 60/023,679 filed Aug. 17, 1996. The subject matter of all the foregoing applications is incorporated herein by reference.

TECHNICAL FIELD OF THE INVENTION

This present invention relates in general to a device for coating a porous media with an influent, or for removing impurities, solids or particulate matter from the influent, and more particularly to a radial-flow type of filter having a nonbonded filter media, and in which the flow of the fluids can be reversed in a backwash operation to remove the filtered matter and thus regenerate the filter for reuse.

BACKGROUND OF THE INVENTION

While there exists many types of filters for removing particulate matter from an influent, such filters are generally classified as the type having a bonded or nonbonded media. A bonded media filter includes a removable cartridge element constructed of a fibrous woven or nonwoven material. The material can be selected with a given porosity so that particulate matter of a given size can be removed from the influent. When the bonded cartridge filter element has a sufficient accumulation of filtered matter thereon, it is simply removed and cleaned, or replaced. The cartridge type filters are not easily backwashed. However, many cartridge-type filters are of the radial-flow type, whereby a maximum surface area is provided for filtering, thereby allowing a reduced resistance to the flow of the influent.

Another family of filters contains a nonbonded media, such as sand, glass beads, diatomaceous earth and other granules or particles through which the influent flows. The nonbonded media is generally of a granular type of material, circular, rounded or irregular in shape so that the spacing between the particles is effective to filter the particulate matter. The advantage of utilizing a nonbonded media filter is that it can be backwashed to regenerate the media. Backwashing can include the fluidizing of the media which allows the fluid to dislodge the entrapped contaminants from both the interstices between the grains of the media, as well as from the surface of each grain itself. The primary disadvantage of such type of filter is the size requirements and costs, as well as filter inefficiencies, in that they have little surface area of the filter exposed to the incoming flow, and thus are forced to utilize larger media grains and higher flow rates per unit area exposed to the incoming flow. In other words, the development of a radial-flow, nonbonded media filter that can be regenerated by backwashing is not a simple task.

In U.S. Pat. No. 3,415,382, by Martin, there is disclosed a radial-flow filter utilizing glass beads as the nonbonded media. While such filter is effective for its intended purpose, it utilizes a rather large-size bead media and can not be regenerated without disassembly.

Radial-flow filters have a broad range of applications in the manufacturing or process industries which require the removal of impurities or solids from an influent. A generalized diagram of a basic radial-flow filter 10 is shown in FIG. 1. The filter consists of two concentric perforated pipes 12 and 14 and a porous filter media 16 filling the annular space 20 between the two pipes, all housed within a filter case 18. The porous media 16 is composed of tiny glass spheres which are of uniform size for a particular filter but can range widely in size for different filters. The spheres can be submicron sized, micron sized or as large as coarse sand, and completely fill the compartment 20 between the perforated pipes 12 and 14. The perforations in the pipes are circular, of uniform size and arrayed in a uniform pattern, but it can be of other arrangements. The concentric-pipes-porous-medium assemblage is encased so that fluid completely surrounds the assemblage during filtration. Filtration takes place along the entire axial length of the filter 10 as the fluid flows radially into the porous media 16 through the perforations in the outer pipe 12, and exits the porous media 16 through the inner perforated pipe 14. The impurities are trapped as the fluid traverses the porous media 16.

The porous media 16 must be cleaned by backwashing after one or more filtration cycles. Backwashing consists of surges of clean fluid that flows radially outwardly from the inner pipe 14, into the porous media 16 and out through the outer perforated pipe 12. The direction of flow is basically opposite to that which takes place during filtration. FIG. 2 shows the filter 10 during a conventional backwash cycle. The relatively high fluid velocities and surges that are generated around the glass spheres dislodge and flush out the accumulated impurities. The impurities are sufficiently small to pass through the spaces between the glass spheres that comprise the porous media 16. However, not all of the impurities are able to be dislodged as a gum residue and particles gradually build up in the porous media 16. Therefore, after a number of filtration backwashing cycles, the filter 10 must be disassembled to replace or recondition the porous media 16.

From the foregoing, it can be seen that a need exists for a radial-flow filter of the type employing a nonbonded media, and constructed so that backwashing capabilities are afforded. Another need exists for a nonbonded media filter constructed such that during the backwashing cycle, the porous media is completely regenerated, thereby eliminating the need to periodically disassemble the filter and completely clean the same or replace the porous media. Another need exists for a nonbonded media filter of the type that can be backwashed, and where the backwashing pressures need not be excessive. Another need exists for a filter of the type where the end of a backwash operation results in a high restriction to the flow of the backwash liquid, thereby increasing the pressure of the liquid and signaling that the backwash operation is complete.

SUMMARY OF THE INVENTION

In accordance with the principles and concepts of the invention, disclosed is a radial-flow device utilizing a porous media and which can be efficiently backwashed to dislodge the impurities and particulate matter to thereby regenerate the porous media. According to a preferred embodiment of the invention, the radial-flow device includes an over-sized media chamber for the granular filter beads. During a backwash cycle, the reverse flow of the backwash liquid provides an upward lifting force on the granular beads and transfers the beads into an upper portion of the chamber, thereby separating the beads and allowing accumulated particulate matter to be dislodged and carried away. During the treatment cycle, the granular beads settle to the bottom of the media chamber so that the influent flows between the beads to filter the particulate matter therefrom.

In accordance with the preferred embodiment of the radial-flow filter, the influent passes through the screen mesh covering the outer perforated cylinder and radially through the filter granules. The filtered influent then passes through an inner screen mesh-covered perforated cylinder. The filtered influent then passes through a series of open check valves located within the mesh-covered inner perforated cylinder, and then to the outlet port of the filter.

During the backwash cycle, the backwash liquid is forced through the filter in a reverse direction, whereby the check valves are closed and the backwash liquid is directed in a reverse direction through the granular media. In the backwash operation, the liquid may generally pass through the granular filter media in a radial direction, and in an upward axial direction. The upward force of the backwash liquid causes the check valves to close, thereby forcing a majority of the liquid into the granular filter media rather than upwardly through the inner perforated cylinder. The upward or drag force of the backwash liquid causes an upper section of the granules to be lifted into a backwash chamber where the particulate matter is separated therefrom and carried out of the filter. This movement and separation of the granular media is sometimes denoted herein as "fluidization," and occurs when the drag force exceeds the buoyant weight of the upper layer or section of the granular media. Once the upper filter section has been fully fluidized, then the subsequent underlying section also becomes fluidized, whereby the section of granular media is forced upwardly so as to be separated and the particulate matter released therefrom. Each underlying section of the filter is sequentially fluidized to thereby regenerate the filter media during the backwash cycle. Because each filter section is sequentially fluidized, the backwash pressure is significantly reduced, thereby easing the requirements of backwash pumps, equipment and the like.

In the preferred embodiment of the invention, disclosed is a method of treating an influent, including the steps of passing the influent radially inwardly through a porous media to treat the influent, and passing the treated influent into an internal volume that is surrounded by said porous media. The treated influent is then passed through an open check valve located in the internal volume, and then the treated influent is coupled from the treatment device to downline equipment.

Other embodiments of the invention include different arrangements, such as O-rings, perforated bladders and check valves for enhancing the fluidizing of the filter media.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts, elements or components throughout the views, and in which:

FIG. 1 is a generalized cross-sectional view of a radial-flow filter well known in the prior art, showing the liquid flow during a filtration cycle;

FIG. 2 illustrates the radial-flow filter of FIG. 1, but during a backwash cycle;

FIGS. 3 and 4 illustrate in generalized form the structural features of the radial-flow filter assembly constructed in accordance with the invention, during a respective filtration cycle and during a backwash cycle;

FIG. 7 is a computer generated drawing of the liquid flow pattern during a backwash operation;

FIG. 8 is a cross-sectional view of one embodiment of a radial-flow filter provided with the backwash and fluidizing capabilities of the invention;

FIGS. 14a and 14b are generalized cross-sectional views of a radial flow filter constructed in accordance with another embodiment of the invention, illustrating a perforated bladder in a filter cycle and in a backwash cycle; and FIGS. 15a and 15b are generalized cross-sectional views of a radial flow filter constructed in accordance with yet another embodiment of the invention, showing a radial flow filter operating in an inverted manner.

DETAILED DESCRIPTION OF THE INVENTION

Figure 5A:
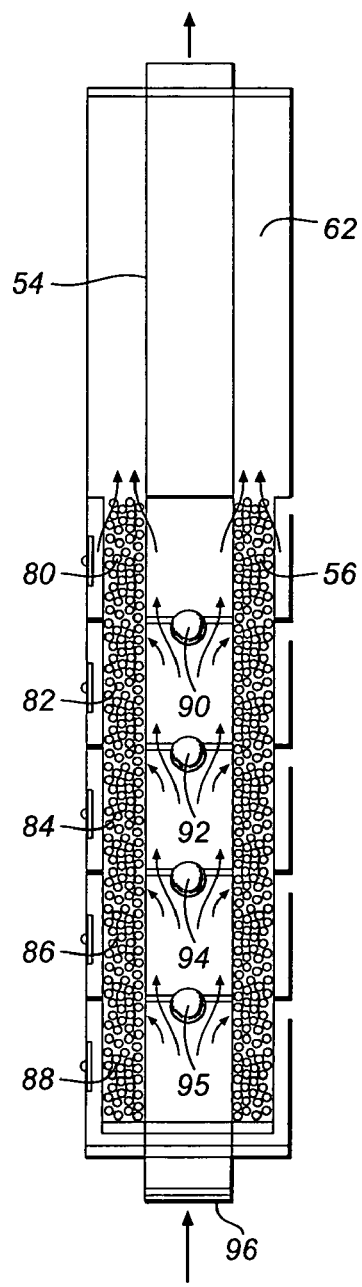
FIGS. 5a-5f are generalized sectional views of a portion of a radial-flow filter showing the different stages of the fluidization of the granular filter media.

FIG. 3 illustrates in a generalized diagrammatic form, the radial-flow filter assembly 50 constructed in accordance with the invention. The radial-flow filter assembly 50 employs a new backwashing technique, thereby avoiding the downtime and expense of reconditioning the nonbonded porous media, as was periodically required by the prior art filters. While the preferred and other embodiments will be described in connection with a device using a granular filter media for filtering particulate matter from an influent, the principles and concepts of the invention can be utilized for coacting a media with an influent, a gas or liquid, where the media periodically requires backwashing to cleanse or regenerate the media.

The radial-flow filter assembly 50 is constructed with a rigid cylindrical housing 52 that extends the entire length of the filter assembly. An inner perforated cylinder 54 with a screen mesh extends the entire length of the filter housing 52. While not shown, the inner screen mesh is formed onto the perforated cylindrical support structure 54 for preventing collapse of the screen mesh. The volume in which the porous media 56 is contained includes two chambers. During the filtration cycle, the porous media 56 is situated in a first chamber 58 located generally in the lower or bottom part of the filter assembly 50. The first porous media chamber 58 comprises an annular area bounded by concentric screen mesh cylinders, one defining the inner screen mesh 54 and the other defining an outer cylindrical screen mesh 60. Much like the inner screen mesh cylinder 54, the outer screen mesh 60 is supported by a perforated cylindrical pipe that extends axially only about halfway through the filter assembly 50. The size of the pores in the screen mesh cylinders 54 and 60 is smaller than the general dianetric size of the porous media 56. In this manner, the screen mesh contains the porous media within the filter 50.

As noted in FIG. 3, and in accordance with an important feature of the invention, the radial flow filter assembly 50 includes an upper backwash chamber 62 of a volume that is preferably about the same as that of the lower chamber 58. As will be described more fully below, the general diameter of the top backwash chamber 62 is greater than that of the bottom porous media chamber 58 to facilitate fluidizing, separation and agitation of the porous media 56 during the backwash cycle. Fixed within the inner perforated cylinder 54 and screen mesh is a plug 64 that prevents the passage of the influent axially from the top portion of the screen mesh cylinder to the bottom portion of the screen mesh cylinder, and vice versa. One or more orifices, one shown as reference numeral 66, are fixed at spaced-apart locations within the inner perforated cylinder 54. The size of each spaced-apart orifice is smaller so that the backwash flow of liquid therethrough toward the plug 64 becomes more restricted. As will be described below in conjunction with the backwash cycle, the orifices 66 force the backwash liquid outwardly into the porous medium 56 to thereby provide a lifting function for fluidizing vertical sections of the porous media.

In the filtration cycle, a small portion of the influent with suspended particulate matter enters the top of the inner perforated cylinder 54 and flows radially through the screen mesh and down the top backwash chamber 62, as noted by arrows 68. This flow of influent facilitates the downward transport of any porous media 56 that may have hung up in the backwash chamber 62 during a backwash cycle. However, a majority of the influent flows through plural ports 70 located in the housing 52 and is directed around the outer perforated cylinder 60. While not shown in FIGS. 3 and 4, the filter assembly 50 is housed in yet another housing having inlet and outlet piping coupled to other pumping equipment. The ports 70 each include a check valve for allowing the entry of the influent into the filter assembly 50, but prevent an opposite flow of backwash liquid. The influent passes through the outer perforated cylinder 60 and radially through the porous media 56 where the particulate matter becomes lodged within the interstices of the porous media, as well as to the surface of the porous media 56 itself. The influent is thus filtered. The filtered liquid passes through the mesh-covered inner perforated cylinder 54 and flows downwardly therein through the orifices 66. The filtered liquid exits the radial flow filter assembly 50 as shown by arrow 72.

The porous media may be glass or other types of beads, sand, diatomaceous earth, activated carbon, anthracite coal or any other granular media that has the desired characteristics for removing particulate matter of a specified size or impurities of a specified type. It is well known that beads of a nominal diameter of 100 microns, when tightly settled together as shown in FIG. 3, can filter particulate matter much smaller than the size of the beads. Hence, the mesh screen covering the perforated cylinders 54 and 60 contains the beads, but allows the particulate matter to flow therethrough and become lodged and filtered by the media bed. Depending upon the amount of particulate matter suspended in the influent being filtered and the volume of the porous media 56, the interstices thereof eventually become full of the particulate matter, thereby reducing the efficiency of the filter assembly 50 and increasing the load on the pump.

In accordance with an important feature of the invention, the radial-flow filter assembly 50 can be efficiently backwashed by reversing the flow of liquid therethrough. The flow of the backwash liquid is shown in FIG. 4. The backwash liquid enters the radial-flow filter assembly 50 at the location shown by arrow 74. The backwash liquid attempts to flow through the inner perforated cylinder 54 in an axial direction, but due to the series of smaller orifices 66, the flow is directed outwardly into the porous media 56. It is noted that the check valve at the port 70 is forced closed during the backwash operation, thereby directing all of the backwash liquid upwardly in the filtration chamber 58.

In accordance with an important feature of the invention, an upper portion of the porous media 56 is first fluidized, as shown in FIG. 4, due to the uplifting drag force exerted thereon by the backwash liquid. In addition, the size of the different orifices 66 allow sections or stages of the porous medium 56 to be fluidized in a sequential manner. It is noted that the top portion of the porous media 56 becomes fluidized first, because the lifting force thereon is greater than the buoyant weight of the layer of the upper portion of the porous media and particulate matter accumulated therein. Once the upper section or portion of the porous media 56 becomes fluidized, the weight thereof is removed from the underlying section of the porous media, whereby such underlying section is then fluidized. All of the porous media 56 in the filtration chamber 58 eventually becomes fluidized, whereby substantially all of the filter media is carried by the backwash liquid into the overlying backwash chamber 62. The sectional fluidization overcomes the need of a large backwash pressure to lift the entire annular column of the porous media. The lifting of the media column is difficult to accomplish without a substantial amount of backwash pressure.

The backwash chamber 62 provides two important functions. First of all, the fluidizing of the porous media 56 from the smaller-diameter filtration chamber 58 is propelled by a swirling action into the backwash chamber 62. This swirling motion tends to agitate the porous medium 56 so that it separates and thereby releases the particulate matter. The particulate matter is carried by the backwash liquid through the mesh-covered inner perforated cylinder 54 and out of the filter assembly 50 in the direction noted by arrow 76. The upper portion of the filter housing 52 can be perforated for allowing larger particulate matter and impurities to be carried out of the filter assembly 50. By choosing the sizes of the orifices 66 as a function of the volume and pressure of the backwash liquid, and as a function of the size and weight of the porous media 50, the backwash liquid can impart sufficient drag forces on the sections of the porous medium 56 to lift all of the granules and transfer the same from the filtration chamber 58 to the backwash chamber 62. A second feature of this technique is that when substantially all of the porous medium 56 has been transferred to the backwash chamber 62, the flow of the backwash liquid is impeded by the accumulation of the fluidized porous media around that part of the inner mesh-covered perforated pipe 54 that extends into the backwash chamber 62. Thus, when fluidization of the porous media 56 is completed, a rise in the pressure of the backwash liquid is noted. This can be a signal that the backwash cycle of the filter assembly 50 is complete and measures can be taken to proceed with a filtration cycle.

The increased resistance to the flow of the backwash liquid can be advantageously utilized when plural radial-flow filters are utilized in parallel. If each of the radial-flow filter assemblies 50 is provided with a common source of the backwash liquid, then when one filter becomes completely fluidized and thereby increases the flow of the backwash liquid therethrough, the pressure of the backwash liquid is then available to the other filters for facilitating fluidizing of the porous media thereof. In other words, once one filter becomes fluidized, it does not allow a substantial flow of backwash liquid therethrough, but substantially impedes the flow therethrough. This can be very helpful when one filter of a number of parallel-coupled filters has a very clogged porous media which requires a major amount of the backwash pressure for fluidizing the porous media thereof.

Figure 5B:
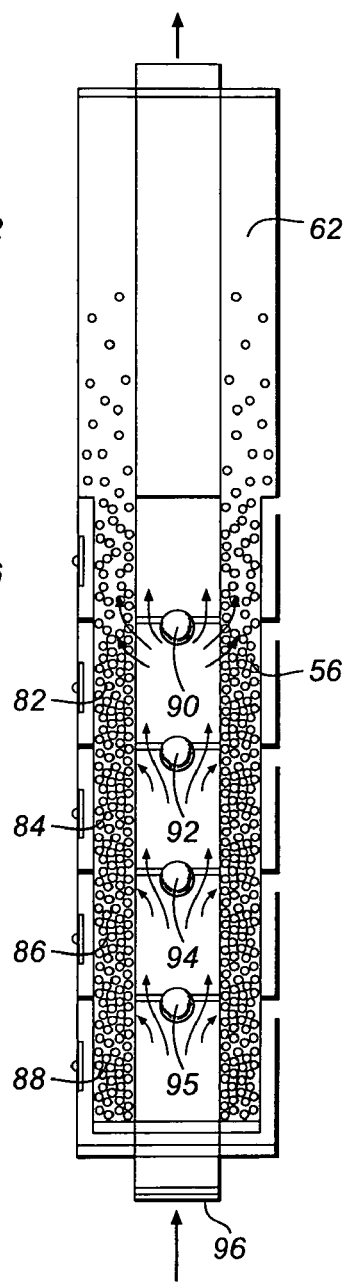
Figure 5C:
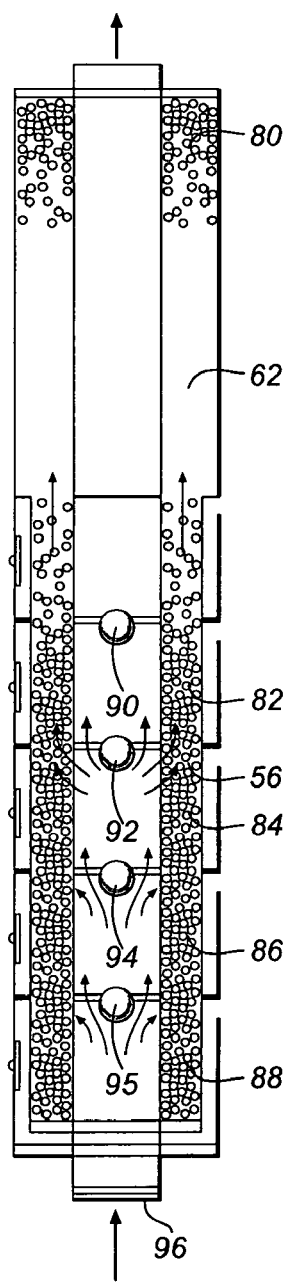
Figure 5D:
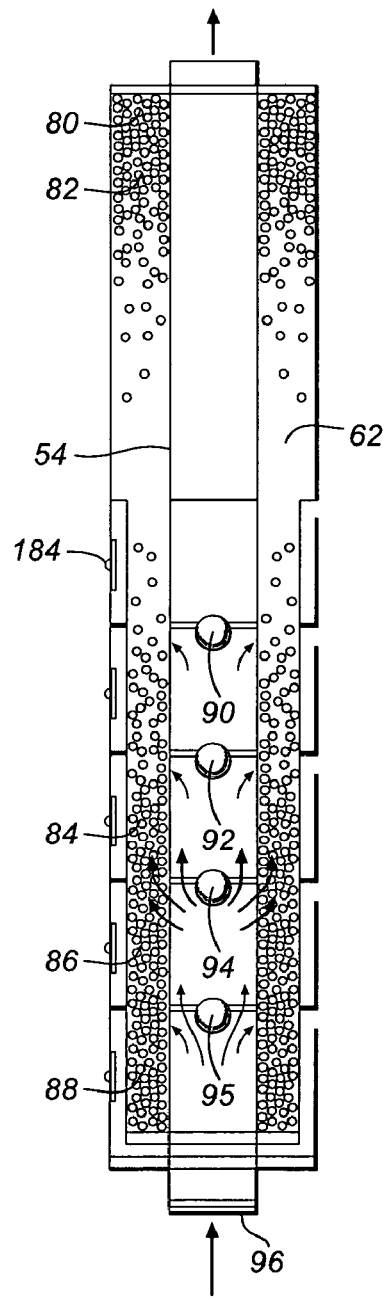
Figure 5E:
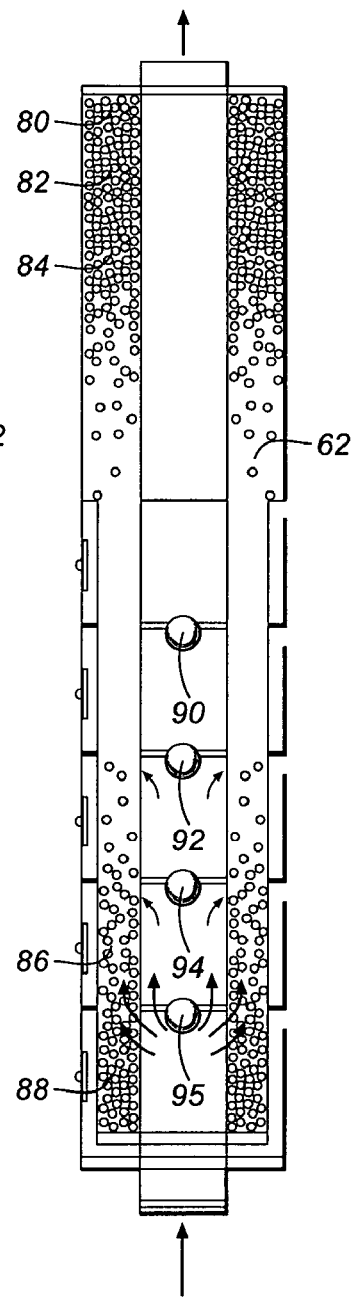
Figure 5F:
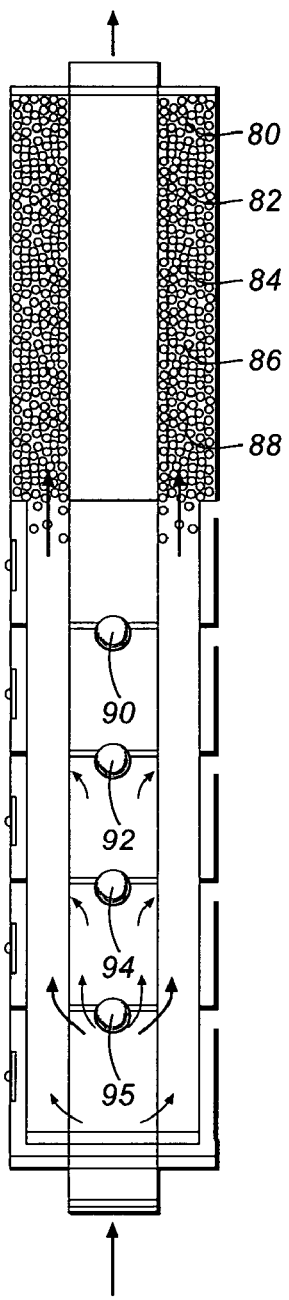

FIGS. 5a-5f pictorially illustrate an example of the sequential fluidizing of the different stages of the porous media 56. Shown is an exemplary radial-flow filter having four check valves 90-95 disposed in the inner perforated cylinder, thus creating five sections or stages of the porous media 56. The check valves are shown in more detail in FIG. 9. FIG. 5a illustrates the annular column of the filter media 56 during the initial backwash cycle, just before fluidization of the granular beads. In FIG. 5b, the top porous media section 80 begins to become fluidized and is lifted by the drag forces into the backwash chamber 62. As noted above, this is because the axial drag force exerted on the top portion 80 of the porous media 56 exceeds the buoyant weight of the media itself, thereby causing the porous media to be forced upwardly into the backwash chamber 61. As the process continues, the first section 80 of the porous media is completely lifted and directed into the backwash chamber 62, as noted in FIG. 5c. In FIG. 5c, the subsequent section 82 begins to fluidize and become transported upwardly to the backwash chamber 62 where it separates from itself, as well as from the filtered particulate matter. The second media section 82 is lifted at this time in the backwash cycle because the buoyant weight of the first or upper section 80 has been removed. In FIG. 5d, a subsequent section 84 of the porous media 56 begins to fluidize and be lifted upwardly to the backwash chamber 62. FIG. 5e shows the fluidizing of the media section 86. In FIG. 5f, the bottom-most section 88 of the porous media is lifted due to the drag forces exerted thereon by the backwash liquid entering the bottom inlet 96 of the filter assembly.

It is important to note that the check valves 90-94 and 95 each have orifices of a different size. The top orifice in the check valve 90 has the smallest opening therein, the bottom orifice 95 has the largest opening, while the middle orifices of check valves 92 and 94 have intermediate-size openings. The inlet 96 preferably has no actual orifice structure, but the opening itself functions as an orifice that is larger than that of the bottom orifice structure 95. The sizes of the orifices are important in the staged fluidizing of the porous media 56. The size of the top orifice in check valve 90 is selected so that, based on the pressure of the backwash liquid flowing into the inlet 96, the drag forces imparted to the porous media 56 cause the upper section 80 to be lifted. Once the top section 80 of the porous media 56 is hydraulically transported upwardly, the backwash liquid continues to flow through the orifice in check valve 90, unimpeded by the porous media 56. However, since the orifice in check valve 90 is somewhat small, the remaining force of the backwash liquid directed through the intermediate orifice in check valve 92 imparts a sufficient drag force to the second section 82 to lift the porous media 56. With the different sized orifices in check valves 90-95, it is assured that each section of the porous media 56 is acted upon by substantially the same drag force, when the section thereabove has been fluidized and moved to the backwash chamber 62. The appropriate size of the orifices can be selected as a function of the pressure of the backwash liquid, the size and weight of the porous media 56, and other parameters, based on trial, error and experimental techniques. As an alternative, the radial-flow filter section 50 constructed according to the invention can be modeled and analyzed by way of appropriate software programs. One such filter fluid dynamics program is identified as Fluent. The radial filter of the invention was appropriately modeled and the characteristics thereof were determined by such program. The results thereof are identified in a Ph.D. thesis entitled Process Characteristics of a Radial Flow Filter During Backwash, by Miguel Amaya, presented Aug. 17, 1996. The disclosure of such thesis is incorporated herein by reference thereto.

Figure 6A:
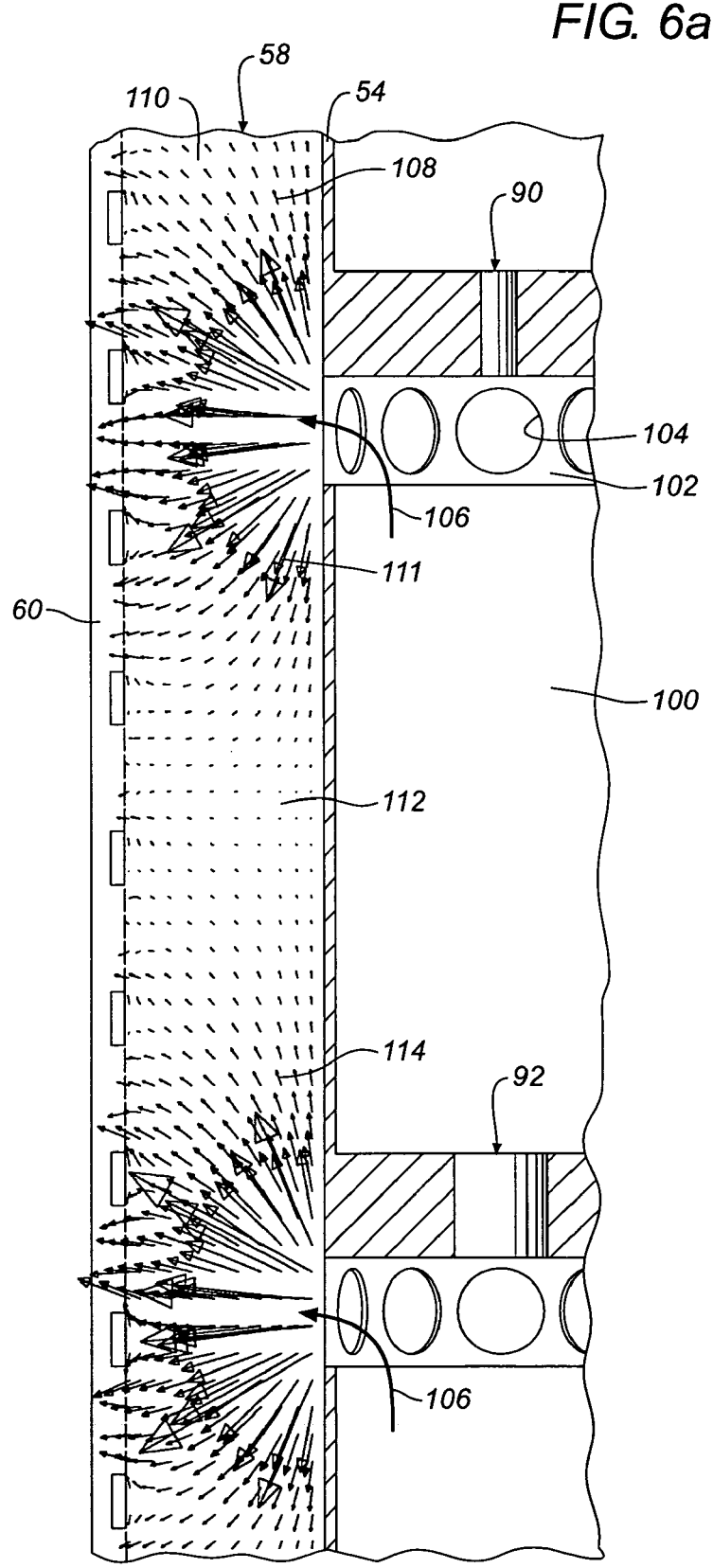
FIG. 6a is a partial cross-sectional view of a portion of a radial-flow filter showing velocity vectors that act upon the granular filter media to produce an upward drag force to thereby cause fluidization of the granular media.

As noted above, an important feature of the invention that allows sectional fluidizing of the porous media during the backwashing operation, is the provision of a series of spaced-apart orifices of decreasing radii installed in the inner perforated cylinder 54. Shown in FIG. 6a is a drawing of the computer analysis of a radial-flow filter structure utilizing such type of orifices and the effect thereof on the porous media located in the annular area between the inner perforated cylinder 54 and the outer perforated cylinder 60. A first orifice structure 90 and a second orifice structure 92 are shown fixed within the inner perforated cylinder 54. In this embodiment, the inner perforated cylinder 54 has a major internal area thereof covered by a bladder 100. The bladder 100 can be a durable sheet-like elastomeric material bonded or otherwise adhered to the inner surface of the perforated cylinder 54. The bladder 100 covers the perforations and obstructs the flow of liquid therethrough. A small area 102 of perforations 104 in the inner perforated cylinder 54 remains uncovered by the bladder 100 in a location just under the perforated structures 90 and 92. As an alternative, rather than employing a bladder 100, the inner cylinder 54 can simply be constructed without being fully perforated. The flow of the backwash liquid in the inner perforated cylinder 54 is shown by the arrows 106. The arrows 108 shown in the filtration chamber 58 illustrate velocity vectors of the backwash liquid.

The orifices 90 and 92 restrict the flow of the backwash liquid in the inner perforated cylinder 54 and give rise to drag forces on the porous media. It can be appreciated that the porous media can be displaced axially upwardly during the backwashing operation, only if the drag forces are greater than the buoyant weight of the porous media itself. The magnitude of the axial components of the liquid velocities identify the regions where the drag forces can exceed the buoyant weight of the porous media. The velocity vectors 108 of FIG. 6a illustrate the dynamics of the fluid flow and drag forces at one instant of time. In the porous media generally shown in media section 110, the velocity vectors 108 are directed generally in an upward direction. Assuming that the top of the porous media is as shown in FIG. 6a, then the buoyant weight of the porous media is the least at this location, with respect to the drag forces produced thereon as a result of the orifice 90. By computer analysis, it has been determined that by the appropriate selection of the size of the orifice 90, the size and spacing of the perforations 104 in the inner perforated cylinder 54, the size and weight of the porous material, the drag forces can be made to exceed the buoyant weight of the porous material. In this event, the porous material is lifted upwardly and removed from the filtration chamber 58 to the backwash chamber 62.

It is noted in the region 112 of the filtration chamber 58 that the velocity vectors are substantially zero and there is no net drag forces exerted on the porous material at such location. The velocity vectors 111 just above the region 112 are directed downwardly. This downward force on region 112 prevents the entire column of the media from being lifted as a plug. However, once the upper section of the media above orifice 90 has been removed, the downwardly directed vectors become nonexistent, thus preparing the subsequent media section for fluidizing. Sequential fluidization from the top to the bottom is thus enhanced. With respect to the second orifice 92, upwardly-directed drag forces are exerted on the porous media at section 114. However, due to the accumulated weight of the porous media situated thereabove, the drag forces do not exceed the buoyant weight of the porous media at section 114. When, however, the upper section 110 of the porous media has been removed and fluidized, the drag forces at section 114 then exceed the buoyant weight of the porous material and the granular filter particles of such section begin to rise and are transferred to the backwash chamber 62 for fluidization. This same type of fluid dynamic action occurs with the remaining orifice sections until the entire annular filtration chamber 58 has been emptied of the porous media.

Figure 6B:
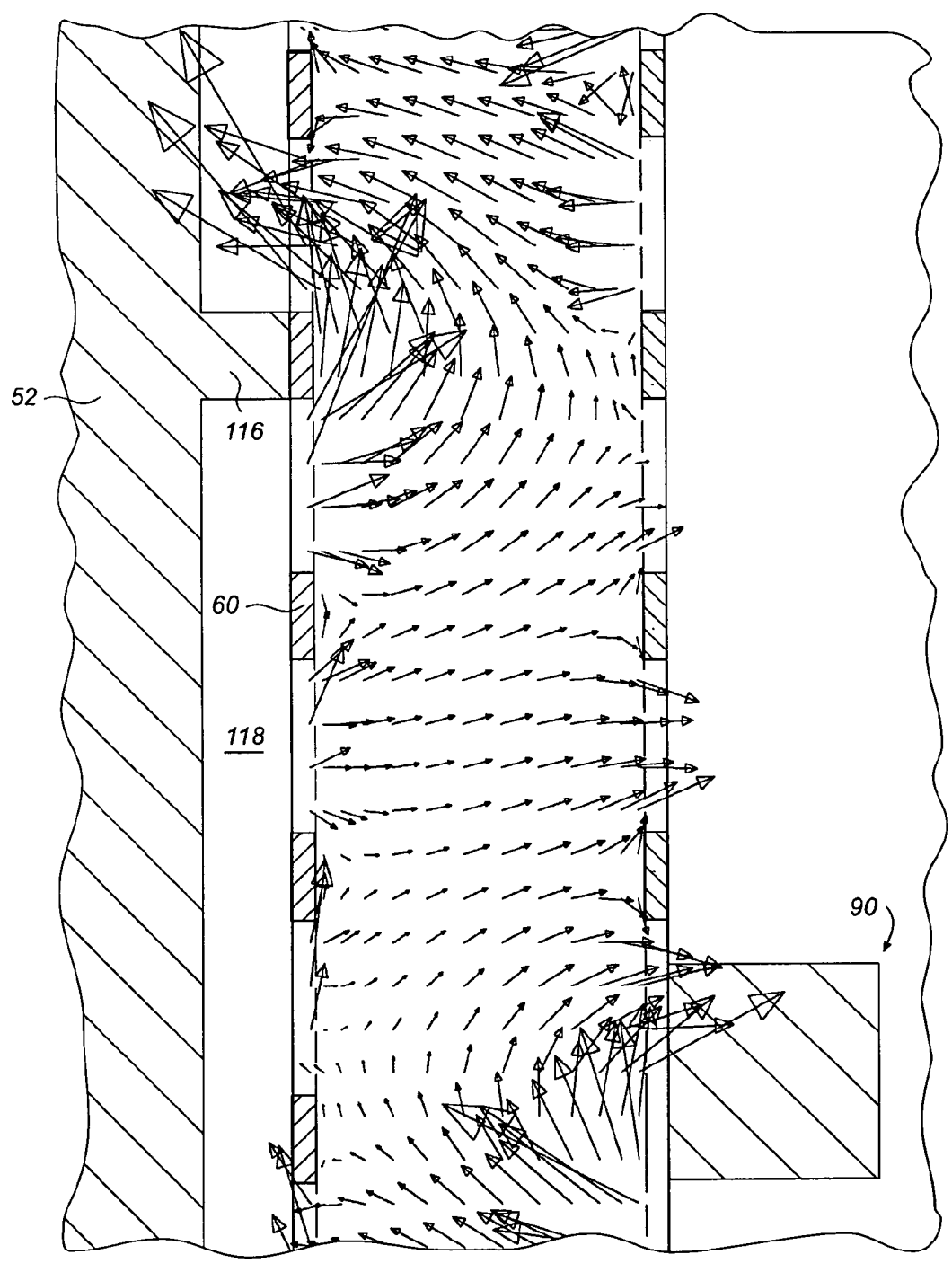
FIG. 6b is a partial cross-sectional view of a radial flow filter equipped with O-rings between the housing and the outer perforated cylinder, with velocity vectors showing the drag forces on the filter media.

FIG. 6b is a partial cross-sectional view of the radial flow filter equipped with an annular band 116, or the like, between the outer perforated cylinder 60 and the housing 52 of the filter assembly. As can be seen, there is one such annular band associated with each section of the porous media 56. The annular band or other type of obstruction, functions to redirect the backwash liquid from the outer annular chamber 118 back into the porous media 56. The annular band 116 can be constructed integral with the inside wall of the filter assembly housing 52, or integral with the outer sidewall of the outer perforated cylinder 60.

FIG. 7 illustrates the flow of the liquid stream during the backwash operation. The porous media of the top section has already been transported by fluidizing. A vertical cross-section of the filter is illustrated, where the inner perforated cylinder is equipped with five orifices with decreasing radii. The heavy and darkened areas illustrate the heavy flow of the backwash liquid, while the individual wavy lines show areas of reduced flow of the backwash liquid. It is noted that in this illustration, the upper section of the porous media 56 has been fluidized, while the lower sections of the porous media bed are exposed to drag forces that are less than the buoyant weight of the overlying media, whereby no fluidization is yet occurring. It can thus be seen that a radial-flow filter can be structured to provide fluidization of the porous material without requiring excessively high pressures or otherwise compromising the efficiency of the filtration operation.

As noted above, various structural elements of the radial-flow filter affect the capability and efficiency of the fluidization process. Amongst the many variables that must be considered in the fluidization of the porous media, it is noted that the magnitude and effect of the flow rate on both the axial drag force component and the pressure drop is larger than the effect of many of the other variables. By computer analysis, it was found that a larger drag force was obtained by increasing the flow rate to the filter, but at the expense of a large pressure drop. The properties and characteristics of the porous media tend to influence the responses more than changes in the perforation pattern of the inner perforated cylinder 54. As an example, the decrease of the particle size of the porous media increased the pressure by 5955Pa on the average, which is nine times the magnitude of the effect of percent of the perforated open area change of the inner perforated cylinder 54. The drag force experienced an average increase with respect to the magnitude of the effect of the percent open area increase. With regard to the design of a radial-flow filter, this suggests that as smaller particle sizes are employed, the type of perforation pattern becomes less critical. It is also noted that changes in the percent open area have an opposite effect on the drag force. For example, the average effect of increasing the percent open area was a decrease in the drag force, while the effect of increasing the perforation size resulted on the average, in an increase in the drag force. As also noted with the computer analysis, with a high percent open area, large perforations in the inner perforated cylinder 54 decrease the drag force, while at low percent open areas, large perforations increase the drag force. Increases in both the percent open area and the perforation size produced comparable decreases in pressure drop across the radial-flow filter. It was also noted that the flow rate of the backwash liquid and the particle diameter of the porous media were found to have the largest influence on the drag force and pressure drop in the filter. The particular type of perforation pattern becomes less relevant with respect to the drag force and pressure drop, with higher flow rates and smaller particle diameters.

In one of the embodiments of the invention, as analyzed by way of computer analysis on the program FLUENT (V4.31), Fluid Flow Modeling, 1995, Fluent, Inc., Centerra Resource Park, 10 Cavendish Court, N.H. 03766, the filter was structured as follows. Five orifices were employed, with radii ranging from 0.254 inches to 1.047 inches. The general diameter of the granular particles were between 44-840 microns, with a specific gravity of 2.5, which is very similar to that of sand. The radius of the inner perforated cylinder 54 was 0.75 inches, with perforations comprising an open area of sixty-six percent. The annular dimensions of the filtration chamber containing the porous media was 0.80 inches (radial) by 22.625 inches (axial). The flow rate or pressure of the liquid media was between 3 gpm to 28 gpm. The backwash pressure was in the range of 0.5 kPa to 10.0 kPa. With a filter constructed as such, it is contemplated that the porous media can be successfully fluidized to thereby completely remove the impurities therefrom and prevent down time by disassembly of the filter or replacement of the porous media.

FIG. 8 illustrates in cross-sectional form a radial-flow filter incorporating many aspects and features described above. The filter 120 includes a base 122 and a removable housing 124 coupled thereto by way of a bolt and clamp arrangement 126. The housing 124 is sealed to the base 122 by means of elastomeric or other types of seals, not shown. The base 122 includes an inlet connection 128 coupled to a supply of influent that is pumped in the direction of arrow 130. The influent includes impurities which may comprise particulate matter, liquids, etc., that are separated by way of the filtration bed contained within the housing 124. Once the impurities are removed, the effluent exits the filter by way of an outlet connection 132, in the direction of arrow 134. In a backwash operation, the backwash liquid is directed into the filter 120 by way of connection 132, and exits the filter with the impurities suspended therein by way of connection 128. Different valving arrangements and control systems are well known to those skilled in the art for disconnecting filters from pumping systems and reconnecting the same to backwash systems.

Fixed within the housing 124 is a radial-flow filter assembly 136. The filter assembly 136 includes an enclosed case 138 for containing and supporting therein the filter parts and components. The case 138 includes a cylindrical sidewall 140 fixed between a top end cap 142 and a bottom end cap 144. The internal volume of the case 138 is sealed to the influent that is coupled to the filter 120 by way of inlet connection 128, except for one or more ports 70 formed in the sidewall 140 thereof. Each port 70 includes a check valve for allowing the influent to enter into the case 138, but prevents liquid from passing in the reverse direction. The case 138 can be constructed of different types of plastics or metals to suit the particular needs of the filtration system. For filtering impurities from water and similar liquids, under low-pressure conditions, the case 138 can be constructed with a PVC or polyethylene plastic. In this event, the end caps 142 and 144 can be bonded, welded or otherwise secured to the cylindrical sidewall 140. Where higher pressures or caustic liquids are employed, such as chemicals to be filtered, the case 138 can be constructed of stainless steel or other types of materials and welded together.

Disposed within the case 138 of the filter assembly 136 are a pair of perforated cylinders. An inner perforated cylinder 54 is supported within respective holes formed in the top end cap 142 and the bottom end cap 144. Moreover, the inner perforated cylinder 54 is supported by a bottom filter chamber end cap 146. The parts can be bonded, threaded or otherwise fixed together for permanent or removable attachment. Secured around the outer circumference of the inner perforated cylinder 54 is a screen mesh 148. The screen mesh can be of a synthetic or metallic material having a porosity sufficiently small to prevent passage therethrough of the granular particles comprising the porous media or filter bed. Fixed within the inner perforated cylinder 54 is a plug 64 to provide an obstruction so as to prevent liquid passage axially along the inner perforated cylinder 54.

As an alternative to the orifice structures 66 described above in connection with FIGS. 3 and 4, the embodiment of FIG. 8 includes plural check valves, one shown as reference character 150. It is contemplated that check valves with orifices will be the preferable structure. The check valves 150 each include a seat, and a ball constructed of a synthetic material so as to be buoyant on the liquids. The check valve 150 includes one or more orifices, and will be described in more detail below. Nevertheless, the check valves 150 are open during the filtration operation, but are generally closed, except for the orifice formed therein during the backwash operation. In this manner, the restriction to the fluid flow during the filtration operation is eliminated.

An outer perforated cylinder 60 is fastened at a bottom end thereof to the filter chamber end cap 146. At the upper end, the outer perforated cylinder 60 is fixed to an annular-shaped piece 152 and bonded or otherwise fastened to the internal surface of the filter assembly case 140. Much like the inner perforated cylinder structure 54, the outer perforated cylinder 60 has attached to the inside surface thereof a screen mesh 154 that serves the same function as the screen mesh 148. The annular space between the outer perforated cylinder 60 and the inner perforated cylinder 54 defines a filtration chamber 156. The filtration chamber 156 is filled with a porous media, such as granular particles for removing impurities from an influent. Located above the filtration chamber 156 is the backwash chamber 62. Preferably, the backwash chamber is about the same volume as the filtration chamber 156, although it may be of a larger volume. As noted in FIG. 8, the backwash chamber 62 has a larger radial dimension than the filtration chamber 156. This difference in radial dimensions is believed to impart a swirling action to the granular particles 58 as they are lifted from the filtration chamber 156 to the backwash chamber 62. The swirling action is believed to agitate and facilitate separation of the particles to free the impurities therefrom. Without the difference in the radial dimensions, the tendency is to lift the entire column of media as a plug:

During a filtration operation, the influent is directed in the following path. From the inlet connection 128, the influent is forced into the space 160 that surrounds the filter assembly case 138. The influent is then forced into the port 70 via the check valve in the sidewall of the filter assembly case 138. Once the influent is forced through the check valve port 70, it fills the annular chamber 162 and completely surrounds the outer surface of the outer perforated cylinder 60. The influent then passes radially through the porous filter media 58 where the impurities are removed. The filtered influent then passes through the perforations of the inner perforated cylinder 54 and into the internal volume 164 of the inner perforated cylinder 54. The filtered influent then passes through the opened check valves 150 and exits at the bottom of the filter 120 to the outlet connection 132. The radial flow aspect allows a large surface area of the porous media 58 to be exposed to the influent. This process continues until the pressure rises at the inlet of the filter 120, denoting that the porous media 58 has accumulated a sufficient amount of impurities that the filtration process is becoming inefficient.

Once it is determined that a backwash operation must be carried out, the appropriate valves are activated, whereby a backwash liquid is forced into the connection 132. The flow path of the liquid is effective to remove the impurities from the porous material 58 and carry the impurities with the backwash liquid out of the filter via the connection 128. The backwash liquid is forced into the connection 132 and up into the central part 164 of the inner perforated cylinder 54. The check valves 150 close, except for the small orifices formed therein. In this manner, the flow of the backwash liquid encounters successively smaller orifices, thereby facilitating the fluidizing of the granular particles, as described above. Each section of the porous media 58 in the filtration chamber 156 becomes fluidized and carried up into the backwash chamber 62. In the backwash chamber 62, the swirling and agitation action imparted to the granular particles 58 frees the impurities therefrom. The impurities flow from the backwash chamber 62 into the central area 166 of the inner perforated cylinder 54, and out the end 168 thereof. It is noted that during the fluidization process, the check valve closes the port 70 in the filter assembly case 138, thereby preventing a substantial flow of the backwash liquid radially outwardly through the outer perforated cylinder 60. In any event, the impurities carried by the backwash liquid are directed from the top end 168 of the inner perforated cylinder 54 into the outer annular area 160, and therefrom to the filter connection 128.

Figure 9:
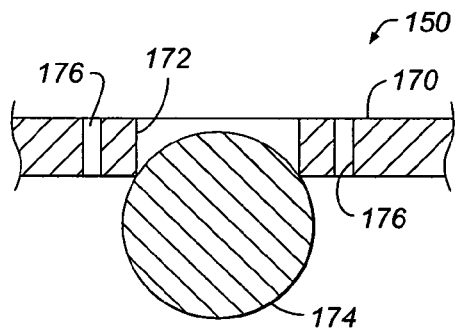
FIG. 9 is a cross-sectional view of a check valve of one embodiment employed in the inner perforated cylinder.

FIG. 9 illustrates one embodiment of the check valves 150 fixed within the inner perforated cylinder 54. The check valve 150 is constructed with a plate 170 having a primary hole 172 that can be plugged with a spherical-shaped ball 174. The ball 174 is preferably constructed of a plastic or similar material that is buoyant. The individual check valve balls may be of different buoyant weights. While not shown, those skilled in the art may prefer to maintain the ball 174 within a wire cage, or the like, to prevent the ball from falling downwardly and inadvertently stopping the hole in the check valve plate located therebelow. Also formed within the plate 170 are one or more orifices 176 that are not plugged or otherwise stopped by the check valve ball 174. The orifices 176 function much like those noted above in connection with FIG. 3 and identified as reference numeral 66. Again, the cumulative open area of each of the orifices 176 of one check valve plate 170 are preferably different from that of the other check valve plates fixed within the inner perforated cylinder 58.

Figure 10:
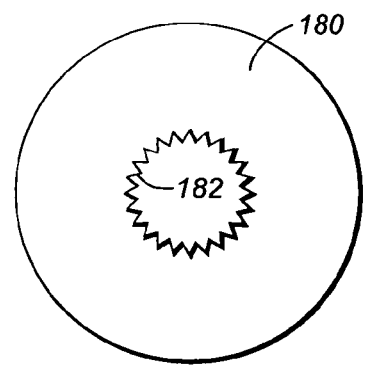
FIG. 10 is a top view of a check value plate constructed in accordance with a second embodiment.

FIG. 10 illustrates another embodiment of a check valve plate 180 that can be fixed within the inner perforated cylinder 58. Rather than having the apertures 176 shown in FIG. 9, the check valve plate 180 of FIG. 10 includes a roughened or serrated edge 182 to prevent the ball 174 from seating in a sealed manner to the plate 180. The irregular-shaped seat 182 of the plate 180 allows liquid to pass therethrough even when the ball 174 is forced within the hole of the plate 180.

Figure 11:
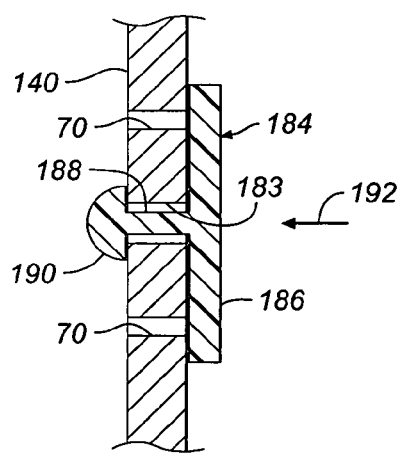
FIGS. 11 and 12 are cross-sectional views of a check valve in respective closed and open positions, as utilized in the case that houses the filter assembly.
Figure 12:
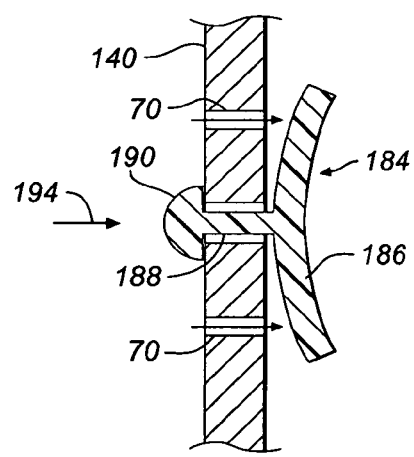

FIGS. 11 and 12 illustrate a check valve that can be employed within sidewall 140 the filter assembly case 138, and particularly in connection with the port 70 of FIG. 8. This check valve includes an elastomeric stopper 184 having a planar portion 186 and a stem portion 188. Formed at the end of the stem 188 is a conical or enlarged end 190 that can be pressed through the anchor hole 183 in one direction during installation, but cannot be easily removed. As noted in FIG. 11, fluid flow in the direction of arrow 192 causes the port holes 70 to be closed by the stopper flap 186, thereby preventing liquid flow through the filter assembly case 140. In FIG. 12, the liquid flow in the direction of arrow 194 allows fluid to flow through the ports 70. Thus, during the filtration operation, influent can pass through the ports 70 into the volume 162 surrounding the outer perforated cylinder 60 (FIG. 8). While only two ports 70 are shown, many more holes can be formed so as to be covered by the elastomeric check valve flapper 186. Other types of check valves, such as elastomeric flaps can be fastened along one edge thereof to the inside wall of the filter assembly case 140 to thereby be forced closed or opened by the directional flow of liquid, and thereby function as a check valve. Those skilled in the art may prefer to employ a host of other types of inlet check valves and inner cylinder check valves in connection with the filter 120, including mechanical and electrical operated devices.

Figure 13:
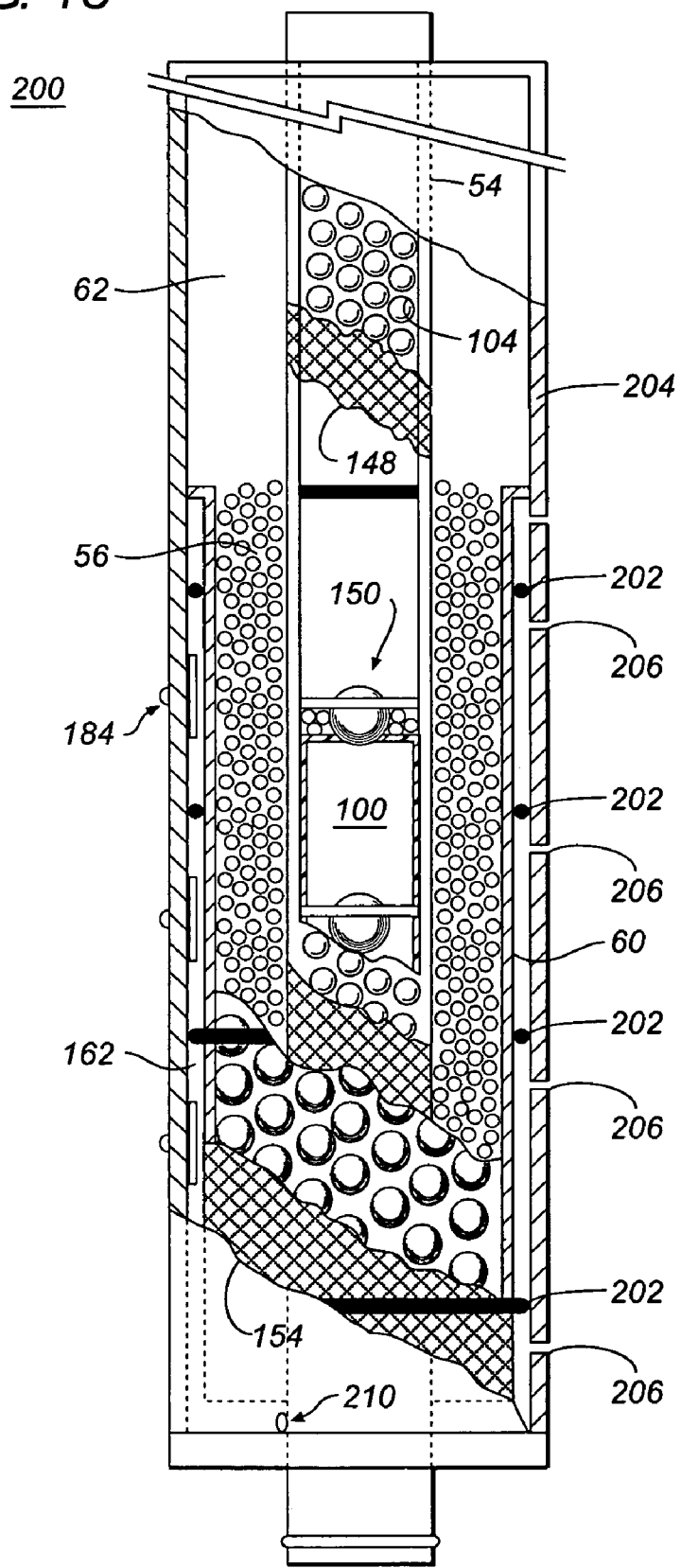
FIG. 13 is a cross-sectional view through different portions of a radial-flow filter constructed in accordance with another embodiment of the invention.

FIG. 13 illustrates another embodiment of the radial-flow filter constructed in accordance with the principles and concepts of the invention. The filter assembly 200 has structural features similar to that shown in FIG. 8. With the construction of filter assembly 200, there are shown plural elastomeric O-rings 202 located between the outer perforated cylinder 60 and a cylindrical case 204. While four O-rings are shown in the embodiment of FIG. 13, any number of O-rings may be utilized. Each O-ring 202 provides a seal between the outer perforated cylinder 60 and the inner surface of the case 204. The O-rings 202 function to change or modify the direction of the liquid flow inside the porous media 56. A substantial amount of the radial flow through the porous media 56 is changed to axial flow. Moreover, additional axial forces are generated within the porous media 56. The use of the O-rings 202 may change the number of check valves 150 needed, and indeed may require a leak hole 206 in the sidewall of the case 204. The leak holes 206 would be located between each adjacent O-ring 202 in order to allow for liquid flow in and out of each section of the porous media. As can be appreciated, the selection of the number of O-rings and the orifice sizes in the check valves 150 and the axial lengths of the sections can insure that adequate axial forces on the porous media 56 exist during the backwash operation.

The filter assembly 200 is also shown to include the bladder 100. The bladder 100 can be used in combination, with or without the orifices in the check valve 150, as well as the O-rings 202. The bladder 100 functions to concentrate substantially all of the backwash liquid flow in the inner perforated cylinder 54 is directed to that area located directly beneath each check valve 150. The bladder 100 maximizes the amount of axial flow that exists in each porous media section. The bladder 100 is shown with the sidewall deformed inwardly in a concave shape, due to the fluid pressure exerted on the outer surface thereof during a filtration cycle.

Lastly, the filter assembly 200 includes a backwash outlet check valve 210. The outlet check valve 210 is placed in an non-perforated portion of the inner cylinder 54, preferably near the bottom of the filter assembly 200. When forced to an open condition by the pressure of the backwash liquid, the outlet check valve 210 provides a flow path from the internal volume of the inner cylinder 54 to the annular volume 162 that exists between the case 204 and the outer perforated cylinder 60. The outlet check valve 210 allows for the backwash liquid to exit below the filtration chamber and be carried directly to the outside annular volume 162 without first having to pass through the porous media 56. Once entering the outside annular volume 162, the backwash liquid exits through either the leak holes 206 or out into the top backwash chamber 62 via the porous media 56.

The outlet check valve 210 also functions to seal the inlet check valves 184 closed during backwashing. This is helpful in situations where very small granular porous media 56 becomes packed with contaminants and allows small amounts of the backwash liquid to reach the outside annular volume 162. In addition, the outlet check valve 210 provides backwash liquid to the outside annular volume 162 and assists in the fluidization of the porous media 56 by the additional liquid diverted inwardly by the O-rings 202 into the porous media 56. It also produces a water scour to the outside annular volume 162 and significantly reduces the amount of backwash liquid required to remove the impurities from the porous media 56. This is because the larger impurities lodged in the screen mesh are flushed directly out of the leak holes 206, rather than being carried back into the porous media 56 and out through the backwash chamber 62. By discharging the larger impurities directly out of the leak holes 206, the particulate matter that would otherwise be too large to enter through the outer screen mesh covering the outer perforated cylinder 60 is completely removed.

As an alternative, all leak holes but the leak hole 206 at the top can be eliminated if each O-ring 202 has a vertical channel cut therein to allow the backwash liquid to flow upwardly around each O-ring 202. Moreover, alternatives to the check valves 150 may be devised by those skilled in the art, including forming orifices in the bladder 100 itself, and allowing a portion of the bladder to block the vertical passageway in the inner perforated cylinder 54.

As can be seen, the filter assembly 200 of FIG. 13 provides additional features which may be considered optional, and in some circumstances may be necessary. Those skilled in the art may find that in many situations, various individual features of the embodiments may be selected so as to produce optimum filtering and backwash results. Also, while the filter media 56 has been described above generally in connection with the removal of particulate matter or impurities, other types of media can be selected so as to remove dissolved solids, provide coaction between solids and fluids, provide coalescing capabilities and even provide a catalyst to the influent supplied to the filter. Nevertheless, the filter constructed according to the principles and concepts of the invention provides an increased surface area for the radial flow of fluids through the media, whether or not it is used for filtering purposes, and provides for an efficient backwash for fluidizing the media.

FIGS. 14a and 14b illustrate another embodiment of the radial flow filter 220, incorporating a perforated bladder 222. The bladder 222 is preferably made of a flexible elastomeric material suitably constructed to withstand the pressures encountered within the filter, as well as the type of influent and backwash fluids passed through the filter 220. The bladder 222 may be constructed as a tubular member. A rigid plate 224 functions as the blocking obstruction within the inner perforated cylinder 54.

Rather than utilizing check valves with orifices or orifice plate structures described above, the bladder 222 includes a pattern of perforations 226 functioning as orifices. The orifices 226 formed in the bladder 222 adjacent a top section 80 of the filter media 56 functions to enable fluidization during a backwash cycle. The orifices 226 can be located annularly around the upper section of the bladder 222. Associated with a second section 82 of the porous media 56, are an additional set of orifices 228 formed in the bladder 222. Subsequent sets 230-236 of orifices are formed in the bladder 222. The open area of each set 226-236 of orifices is larger, as a function of distance away from the plate 224. As such, the sets of orifices function very much like that described above in conjunction with the orifice structures shown in FIGS. 3 and 4. The variation in the open area between the sets of orifices can be accomplished in various ways. For example, the top orifice set 226 can comprise a predefined number of openings having a first diameter. The second set 228 of orifices can include the same number of openings, but of a larger diameter. Each subsequent set 230-236 of the orifices can be formed with orifices of successively larger diameters. As an alternative, the orifices of the sets can be of the same diameter, but ranging from a small number of orifices associated with set 226, and with larger numbers of orifices as a function of the distance from the plate 224. Many other arrangements can be devised by those skilled in the art to achieve an orifice structure that facilitates the fluidizing of the porous media 56.

It is significant to note that the orifices of the various sets 226-236 are fabricated so as to be aligned with respective perforations in the inner perforated cylinder 54. In this manner, the backwash fluid is allowed to flow through both the orifices of the bladder 222 and the perforations in the inner perforated cylinder 54, into the porous media 56. With regard to the bottom set 236 of orifices, they are substantially large so as to pass the filtered influent therethrough without creating a pressure differential thereacross.

FIG. 14*a* illustrates the radial flow filter assembly 220 during the filter cycle. During such cycle, the influent enters the assembly 220 in the direction of arrow 240 and enters the column of the porous media 56 at the top thereof. However, a majority of the influent passes through the opened check valves 184 and flows radially through the respective sections of the porous media 56. Each section is separated by a respective O-ring 202 for facilitating fluidization during the backwash cycle. Because of the pressure of the filtered influent passing radially through the media 56, the sidewall of the bladder 222 is forced inwardly, as shown in FIG. 14*a*. While some of the filtered influent passes through the various sets of orifices during the filtration cycle, a majority of the influent passes through the set of large orifices 236 and out of the filter assembly, shown by arrow 242.

FIG. 14*b* illustrates the filter assembly 220 during a backwash cycle. During the backwash cycle, the backwash fluid enters the assembly in the direction of arrow 244. The backwash liquid enters the inner volume of the bladder 222, thus pressing it against the inside surface of the inner perforated cylinder 54. The backwash liquid is forced through the sets of orifices, as noted by arrows 246. The backwash fluid then flows into the porous media 66 for fluidization thereof in the manner noted above. The check valves 184 are closed during the backwash cycle for facilitating sequential fluidization of the various sections of the porous media 56. The backwash fluid carries the impurities and the released particles out of the filter assembly 220 in the direction noted by arrow 248.

FIGS. 15*a* and 15*b* illustrate another embodiment of the radial-flow filter that operates in an inverted manner. This embodiment is particularly well suited for use with granular beads that are either large or generally lightweight. In the filter cycle, as shown in FIG. 15*a*, a porous media setting liquid, which is preferably not the influent, is pumped into the filter assembly 250 in the direction of arrow 252. The drag forces imparted from the setting fluid to the porous media 56 cause the beads to be lifted upwardly into the top portion of the filter chamber. Each check valve 150 fixed within the inner perforated cylinder 54 in the backwash chamber 62 is closed, while the check valves 150 situated in the filtration chamber are opened. Once the porous media 56 is lifted into the filtration chamber by the setting liquid, a valving arrangement (not shown) is actuated to thereby allow the influent to pass into the filter assembly 250 in the direction noted by arrow 252. Moreover, the influent is allowed to pass through the open inlet check valves 184 in the direction of arrows 254.

The influent passes radially through the media 56 and into the internal volume of the inner perforated cylinder 54, via the opened check valves 150. The filtered influent then exits the assembly 250 in the direction noted by arrow 256.

FIG. 15*b* illustrates the inverted filter assembly 250 during a backwash cycle. In the backwash cycle, the porous media 56 is simply allowed to settle by way of gravity into the chamber located at the bottom of the assembly. During the movement of the filter media 56 from the upper filtration chamber to the lower backwash chamber, the granular particles are separated and the impurities are removed therefrom. The particulate matter and impurities pass through the open check valves within the lower portion of the inner perforated cylinder 54 and are carried out of the assembly 250 by the backwash liquid, in the direction of arrow 260. In the event that the column of the porous media 56 is not moved downwardly by the force of gravity, the backwash liquid entering the assembly 250 in the direction of arrow 262 causes sequential fluidization of the sections in the manner described above.

While the preferred and other embodiments of the invention have been disclosed with reference to a specific radial-flow filter, it is to be understood that many changes in detail may be made as a matter of engineering choices, without departing from the spirit and scope of the invention, as defined by the appended claims. Indeed, those skilled in the art may prefer to utilize only certain features of the invention, or utilize various features from the different embodiments to achieve the individual or combined advantages thereof.

What is claimed is:

1. A method of treating an influent with a treatment device, comprising the steps of:
    passing the influent radially inwardly through a porous media to treat the influent, and passing the treated influent radially into an internal volume that is surrounded by said porous media, and then passing the treated influent axially in said internal volume in a first direction to an outlet;
    preventing the porous media from entering said internal volume;
    passing a pressurized backwash fluid axially in said internal volume in a second direction, opposite said first direction;
    using an orifice restriction located within said internal volume to define respective upper and lower portions of said internal volume;
    forcing the pressurized backwash fluid into said internal volume so that a portion of the pressurized backwash fluid is forced through said orifice and into the upper portion of the internal volume and into the porous media to create a drag force on an upper portion of the porous media, and a remainder of the pressurized backwash fluid in the lower portion of said internal volume is forced into the porous media and thereby bypasses said orifice, whereby a drag force is imparted on a lower portion of the porous media; and
    fluidizing respective portions of the porous media when the drag force exerted thereon by the pressurized backwash fluid is greater than a buoyant weight of the respective portion of the porous media.

2. The method of claim 1, further including treating the influent by filtering impurities therefrom;
    coupling the treated influent from said treatment device to downline equipment; and
    detecting a pressure rise in the influent coupled to said treatment device to determine if said porous media has accumulated a sufficient amount of impurities.

3. The method of claim 1, further including backwashing the treatment device by passing the pressurized backwash fluid into the lower portion of said internal volume of the treatment device, then passing a portion of the backwash fluid through said orifice in the upper portion of said internal volume and radially outwardly into the porous media.

4. The method of claim 1, further including backwashing the porous media by sectional fluidization thereof using a plurality of said orifices to define a plurality of portions of said internal volume.

5. The method of claim 4, further including arranging the orifices axially in said internal volume, and wherein the orifice open areas are sequentially smaller.

6. The method of claim 1, further including passing the backwash fluid serially through plural spaced apart orifices in said internal volume which is vertically oriented, and fluidizing the porous media from a top thereof to a bottom thereof.

7. The method of claim 1, further including fully blocking an axial flow of the backwash fluid in an uppermost portion of said internal volume above a topmost orifice by a blockage in said inner volume.

8. The method of claim 7, further including forming the internal volume using a perforated tubular member with a blocking plate fixed therein in said internal volume, wherein said blocking plate defines a top internal volume of said perforated tubular member and a bottom internal volume of said perforated tubular member.

9. The method of claim 8, further including using a bottom annular space around a bottom portion of said perforated tubular member to contain said porous media during treatment thereof when the treatment fluid passes radially inwardly therethrough, and using a top annular space around a top portion of said perforated tubular member to which fluidized porous media is carried.

10. The method of claim 9, further including forming the blockage in said internal volume laterally adjacent a location between said top and bottom annular space around said perforated tubular member.

11. The method of claim 9, further including passing the backwash fluid upwardly in said bottom internal volume and upwardly through said orifice, then passing the backwash fluid radially outwardly though said perforated tubular member into said bottom annular space to fluidize a portion of the porous media, then passing the backwash fluid upwardly into said top annular space with fluidized porous media, and then passing the backwash fluid into the top internal volume of said perforated tubular member.

12. A method of treating an influent, comprising the steps of:
   using an inner perforated member and an outer perforated member to contain a porous media therebetween, and passing an influent to be treated radially inwardly through said porous media so that the treated influent enters an internal volume of said inner perforated member;
   using an upper annular space around an upper portion of said inner perforated member as a fluidizing chamber to which fluidized porous media is carried;
   passing a portion of the influent axially downwardly in said upper annular space to cause the porous media to settle downwardly;
   passing a backwash fluid upwardly in a bottom portion of said inner perforated member and through an orifice to cause fluidization of a portion of the porous media located between said inner perforated member and said outer perforated member, said fluidized porous media carried to said fluidizing chamber; and
   passing the backwash fluid to the fluidizing chamber and back into a top portion of said inner perforated member.

13. The method of claim 12, further including blocking passage of the backwash fluid in said inner perforated member with a blocking plate to prevent passage of the backwash fluid from a bottom portion of the inner perforated member through the internal volume and to the top portion of the inner perforated member.

14. The method of claim 13, further including preventing fluidized porous media from entering into an internal volume of the top portion of the inner perforated member.

* * * * *